United States Patent
Ogasawara et al.

(10) Patent No.: US 7,379,454 B2
(45) Date of Patent: May 27, 2008

(54) PACKET ROUTING APPARATUS AND ROUTING CONTROLLER

(75) Inventors: Nobuo Ogasawara, Yokohama (JP); Kenichi Sakamoto, Hachiohji (JP); Shinichi Akahane, Hachiohji (JP); Hiroki Yano, Hadano (JP); Tomohiro Baba, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 991 days.

(21) Appl. No.: 10/211,513

(22) Filed: Aug. 5, 2002

(65) Prior Publication Data
US 2003/0026260 A1 Feb. 6, 2003

(30) Foreign Application Priority Data
Aug. 6, 2001 (JP) ............................. 2001-237380

(51) Int. Cl.
*H04L 12/28* (2006.01)
*H04J 3/16* (2006.01)
(52) U.S. Cl. ...................... 370/389; 370/392; 370/466
(58) Field of Classification Search .............. None
See application file for complete search history.

(56) References Cited

U.S. PATENT DOCUMENTS
5,546,387 A * 8/1996 Larsson et al. ............. 370/392
6,044,077 A * 3/2000 Luijten et al. .............. 370/392

FOREIGN PATENT DOCUMENTS
JP 2000-151709 5/2000

* cited by examiner

*Primary Examiner*—Steven Nguyen
(74) *Attorney, Agent, or Firm*—Mattingly, Stanger, Malur & Brundidge, PC

(57) ABSTRACT

A packet routing apparatus has a routing information table comprised of a plurality of sub-tables. Each sub-table includes an entry of a first format indicative of routing information, and at least one of the sub-tables includes, in addition to the entry of the first format, an entry of a second format for designating another sub-table to be referred to. A routing processor of the packet routing apparatus refers to a sub-table designated by an input line interface. As a result, when the entry of the second format is retrieved, the routing processor executes routing of an input packet and header conversion by referring to another sub-table designated by the entry.

13 Claims, 11 Drawing Sheets

FIG. 11

PORT NUMBER CONVERSION TABLE

OUTPUT LOGICAL PORT NO.

| OUTPUT PHYSICAL PORT NO. | DEFAULT SECOND LAYER DA | 411-i |
| 412 | 413 | |
| OUTPUT PHYSICAL PORT NO. | DEFAULT SECOND LAYER DA | 411-q |

ROUTE INFORMATION CONVERSION TABLE

ROUTE INFORMATION

| SECOND LAYER DA | 421-i |
| SECOND LAYER DA | 421-q |

42

PACKET ROUTING APPARATUS AND ROUTING CONTROLLER

BACKGROUND OF THE INVENTION (1) Field of the Invention

The present invention relates to a packet routing apparatus. More particularly, the invention relates to a packet routing apparatus suitable for relaying a variable length packet between lines of different communication protocols.

(2) Description of the Related Art

In an IP network using the TCP/IP protocol, various applications of electric mails, WWW (World Wide Web), and the like can be used. The IP network has advantages such as lower communication cost as compared with a conventional telephone-based switching network. Consequently, traffic has been being explosively increased in recent years.

A router disposed in each of nodes of an IP network determines the outgoing route of a received packet on the basis of the IP header of the packet. A software router is in the main stream of the conventional routers and the software router determines the outgoing route of a received packet by a CPU connected to an input/output line interface via a bus. To address an explosive increase in traffic, in recent years, a hardware router which increases the speed of packet transfer by analyzing the header of an IP packet by hardware is in the limelight. An example of the technique of analyzing the header by hardware is disclosed in Japanese Unexamined Patent Application No. 2000-151709.

One of transfer method for transmitting IP packets on an IP network adopts encapsulation of an IP packet with the header of a lower layer. For encapsulation of IP packets, connection-oriented protocols such as an ATM (Asynchronous Transfer Mode) communication, a frame relay of an HDLC, and PPP (Point to Point Protocol) are used. According to an MPLS (Multi-Protocol Label Switching) system examined by the IFTF (Internet Engineering Task Force), an IP packet is encapsulated by using a shim header including a label.

When IP packets are encapsulated with the header of a lower layer, multiplex transfer of IP packets can be realized between nodes. By reducing the number of destination indication bits, the transfer speed can be increased. When a connection-oriented packet transfer is performed in a lower layer, a closed network can be maintained. In this case, by using the function of the lower layer, a virtual private network (VPN) can be realized on an IP network.

As communication services such as frame relay and ATM are improved by major carriers, the configuration of an intracorporate communication network employing the frame relay communication or ATM communication for the lower layer and using the TCP/IP protocol in the upper layer is increasing.

In the case of realizing the VPN on the Internet, a node (hereinbelow, called an edge node) disposed at the entrance of a network (hereinbelow, called a core network) of an Internet service provider (ISP) for providing VPN services encapsulates IP packets. Each of nodes (hereinbelow, called core nodes) in the core network transfers a received packet in accordance with an encapsulation header. An edge node disposed at the exit of the core network removes the encapsulation header.

SUMMARY OF THE INVENTION

Each of the nodes constructing the core network, therefore, has to perform a complicated header processing which differs according to the combination of an input line and an output line of a received packet.

For example, in the case where an edge node transfers a packet received from an access network side to which a user terminal is connected to a core network, the edge node determines a transmission port on the basis of the IP header of the received packet, encapsulates the received packet in conformity with the protocol of a lower layer, and transmits the resultant packet to the core network. In the case where the edge node transfers a packet received from the access network side to another access network connected to the same node, the edge node determines the transmission port on the basis of the IP header of the received packet and transfers the received packet as it is to the transmission-side access network.

In the case where the edge node transfers a packet received from the core network to an access network, the edge node determines the transmission port on the basis of the IP header in a payload field of a received encapsulated packet, removes the encapsulation header, and transmits the resultant received packet to the access network.

The core node determines the transmission port on the basis of the encapsulation header of the IP packet received from the core network, rewrites the encapsulation header as necessary, and transfers the resultant packet to the transmission-side core network.

At the edge node forming the exit or entrance of the core network, a header area to be used to determine an outgoing route differs according to whether the input line is the access network or core network. The edge node has to change header conversion processing according to whether the outgoing route of the received packet is the access network or core network. Consequently, the edge node has to have interfaces of different functions for each input line. Since the function of the core node is different from that of the edge node, the core node has to have an interface different from that of the edge node. When a network is becoming matured, the edge node has to have a packet transfer function for returning a packet received from a core network to the core network. In this case, the edge node is requested to have a function similar to that of the core node.

In the case where a VPN is formed in a core network, the edge node has to identify the VPN on the basis of the encapsulation header of a packet received from the core network and identify the transfer destination of the packet from the IP header. That is, the edge node has to have the function of determining the destination on the basis of a combination of the encapsulation header and the IP header and transferring the packet.

In the case of connecting networks of two different Internet service providers (ISP) via an inter-work router, generally, a protocol applied to encapsulate an IP packet differs according to an ISP network. Consequently, the inter-work router determines a destination route on the basis of IP header information as a protocol common to the networks, and transfers packets between the ISP networks. In this case, if the inter-work router removes the encapsulation header of a layer lower than an IP layer, a problem arises such that a packet belonging to the VPN and general packets cannot be distinguished from each other in the inter-work router. Particularly, when a plurality of VPNs using private IP addresses are connected to the inter-work router, there is the possibility such that packets having the same IP address but whose users are different from each other are generated and accurate packet transfer cannot be performed by the inter-work router.

The invention provides a packet routing apparatus having general versatility capable of realizing node functions which differ according to uses like the above-described edge node and the core node by the same apparatus configuration.

The invention provides a packet routing apparatus effective for routing packets between lines of different communication protocols.

The invention provides a packet routing apparatus effective to transfer packets between transmission lines having different communication protocols to each other.

The invention also provides a packet routing apparatus capable of flexibly adapting to a protocol layer of a packet header.

The invention provides a packet routing apparatus capable of routing input packets at high speed in accordance with header information of a plurality of layers attached to packets.

The invention provides a routing controller and a packet routing apparatus capable of easily changing a header converting function in accordance with applied protocols of input and output packets.

The invention provides a routing controller and a packet routing apparatus adapted to transfer of a variable length packet using a private IP address.

A packet routing apparatus according to the invention comprises: a plurality of input line interfaces connected to input lines; a plurality of output line interfaces connected to output lines; and at least one routing processor for specifying a transfer destination of an input packet by referring to a routing information table based on header information of the input packet.

The packet routing apparatus routes a variable length input packet received by one of the input line interfaces to one of the output line interfaces specified by the routing processor. In the packet routing apparatus, the routing information table is comprised of a plurality of sub-tables, and each of the sub-tables includes at least one entry of a first format indicative of routing information. At least one of the sub-tables includes, in addition to the entry of the first format, at least one entry of a second format for designating another sub-table to be referred to. The routing processor refers to a sub-table determined according to the input line interface and, when the entry of the second format is retrieved as a table entry having a relation corresponding to the input packet, by referring to another sub-table designated by the entry, a transfer destination of the input packet is specified.

More specifically, the routing information table is comprised of, for example, sub-tables corresponding to protocol layers of a network communication model of the second to fourth layers specified by an OSI reference model and various protocol layers which become encapsulation headers of IP packets. For example, the routing processor specifies a sub-table to be referred to on the basis of sub-table designation information added to an input packet by each input line interface.

In the packet routing apparatus according to the invention, at least one of the sub-tables includes, as an entry of the first format, a table entry indicative of routing information and encapsulation header information, and the routing processor encapsulates an input packet or rewrites an encapsulation header in accordance with encapsulation header information retrieved from the sub-table. In an embodiment of the invention, at least one of the sub-tables includes, as the entry of the first format, a table entry indicative of routing information, encapsulation header information, and a control code and the routing processor adds, removes, or rewrites an encapsulation header of an input packet in accordance with encapsulation header information and a control code retrieved from the sub-table.

In the packet routing apparatus according to the invention, each of the input line interfaces inputs a variable length packet including header information of a second layer of an OSI reference model in a header to the routing processor, and the routing processor has means for rewriting the second layer header information of each output packet to be supplied to the output line interface.

BRIEF DESCRIPTION OF THE DRAWINGS

FIG. 11 is a diagram showing the configuration of a port number conversion table 41 illustrated in FIG. 1.

FIG. 12 is a diagram showing the configuration of a route information conversion table 42 illustrated in FIG. 1.

DETAILED DESCRIPTION OF THE EMBODIMENTS

An embodiment of the invention will be described below with reference to the drawings.

Figure 2:
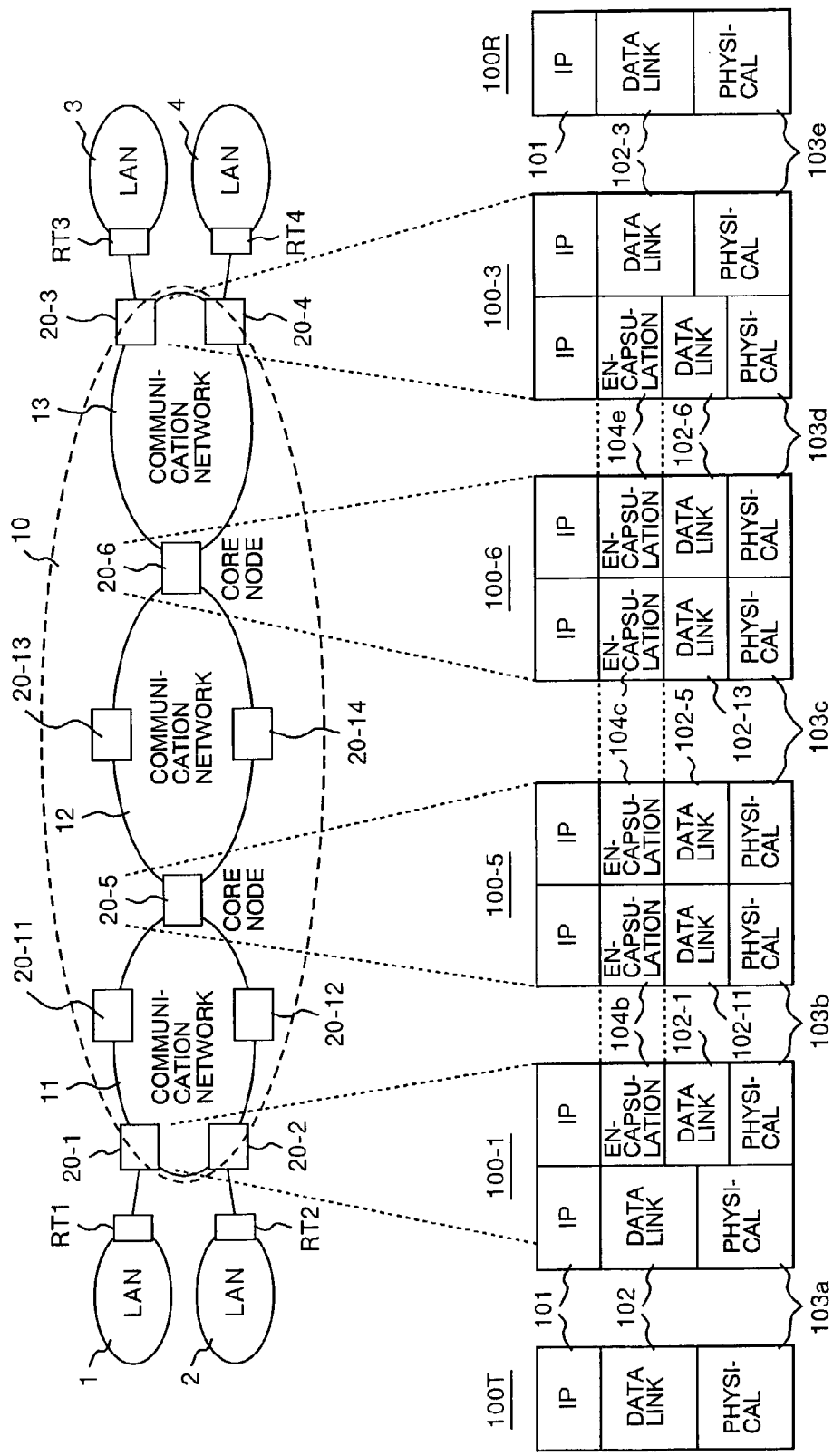
FIG. 2 is a diagram showing an example of a network to which a node in an embodiment is applied, and transfer packets.

FIG. 2 shows an example of a network to which a node (packet routing apparatus) according to the embodiment is applied.

In the diagram, access networks (LANs) 1 to 4 to which user terminals are connected are connected to edge nodes 20-1 to 20-4 of a core network 10 via IP routers RT1 to RT4, respectively. Each edge node accommodates a plurality of access networks via the IP router. In the example, the core network 10 is comprised of a plurality of communication networks 11 to 13. Nodes 20-5 and 20-6 are core nodes for connecting the communication networks 11 to 13 in the core network 10. Nodes 20-11 to 20-14 are core nodes for connecting the communication networks to not-illustrated other communication networks in the core network. The nodes 20-11 to 20-14 may function as edge nodes for connecting the communication networks to other access networks.

In the network, for example, the communication network 11 is provided by Company A as an Internet service provider (ISP), the communication network 13 is provided by Company B as an ISP, and the communication network 12 is provided by Company C as a carrier. The communication networks 11 and 13 may be provided by Company A as the same ISP, and the communication network 12 may be provided by another ISP. Each of the edge nodes 20-1 to 20-4 serves as a node (packet routing apparatus) which is disposed at a connection point (service point) between the core network 10 and each of the access networks (LANs 1 to 4). Each of the core nodes 20-5 to 20-14 disposed in the core network 10 routes a received IP packet in accordance with the protocol header of a layer lower than the IP protocol.

It is now assumed that an IP packet is transmitted from a user terminal A connected to the LAN 1 to a user terminal B accommodated in the LAN 3. The router RT1 applies a network communication protocol of a third layer (network layer, or Internet layer in the TCP/IP hierarchy) 101 of an OSI (Open System Interconnection) reference model and a second layer (data link layer) 102 to a packet received from the LAN 1 as shown by a protocol stack 100T, and transfers the received packet to the edge node 20-1 with a first layer (physical layer: PHY) protocol 103a peculiar to a communication line between the router RT1 and the edge node 20-1. For simplicity, the seventh to fourth layers (application layer, TCP layer, and UDP layer in the TCP/IP hierarchy) of the OSI reference model are omitted from the protocol stack 100T.

In the following description, the same reference mark is commonly used by a protocol layer and a corresponding header. For example, a header generated by the network layer (Internet layer) 101 is called an IP (Internet Protocol) header 101. A packet output from an IP router or node will be called in correspondence with a reference mark in a protocol stack shown in FIG. 2. For example, an output packet of the router RT1 will be called an IP packet P100T.

When the IP packet P100T is received from the router RT1, the edge node 20-1 encapsulates the IP packet P100T in a protocol 104b of a lower layer of the IP protocol used in the communication network 11 as shown in a protocol stack 100-1 so that the IP packet P100T is converted into an IP packet P100-1 having an encapsulation header 104b (for example, a shim header in the MPLS), and the IP packet P100-1 is transmitted to the communication network 11. The IP packet P100-1 is transferred in accordance with destination information (label in the case of the MPLS) of the encapsulation header 104b in the communication network 11, and reaches the core node 20-5. Between the edge node 20-1 and the adjacent node 20-11, and between the adjacent node 20-11 and the core node 20-5, the IP packet P100-1 is transmitted in accordance with the headers 102-1 and 102-11 of the data link layer.

When the IP packet P100-1 is received, the core node 20-5 changes the encapsulation header 104b into another encapsulation header 104c which becomes effective in the communication network 12 as shown in a protocol stack 100-5, and transmits the resultant as an IP packet P100-5 to the communication network 12. The packet P100-5 is transferred in accordance with destination information of an encapsulation header 104c in the communication network 12 (destination information of data link layer headers 102-5 and 102-13 between adjacent nodes) and reaches the core node 20-6.

As shown by a protocol stack 100-6, the core node 20-6 changes the encapsulation header 104c in the received IP packet P100-5 into an encapsulation header 104e which becomes effective in the communication network 13 and transmits the resultant packet as an IP packet P100-6 to the communication network 13. The IP packet 100-6 is transferred in accordance with destination information of the encapsulation header 104e in the communication network 13 (destination information of a data link layer header 102-6 between neighboring nodes) and reaches the edge node 20-3.

On the basis of the destination information included in the encapsulation header 104e and the destination information included in the IP header 102 of the received IP packet P100-6, the edge node 20-3 identifies the transfer destination of the received packet, that is, the access network (LAN) 3 in this example. As shown by a protocol stack 100-3, the encapsulation header 104e is removed from the received IP packet 100-6, thereby obtaining an IP packet P100R in the original form, and the IP packet P100R is transferred to the router RT3 of the access network (LAN) 3. The IP packet P100R is relayed to the access network (LAN) 3 by the router RT3 and received by the destination user terminal B.

Figure 3:
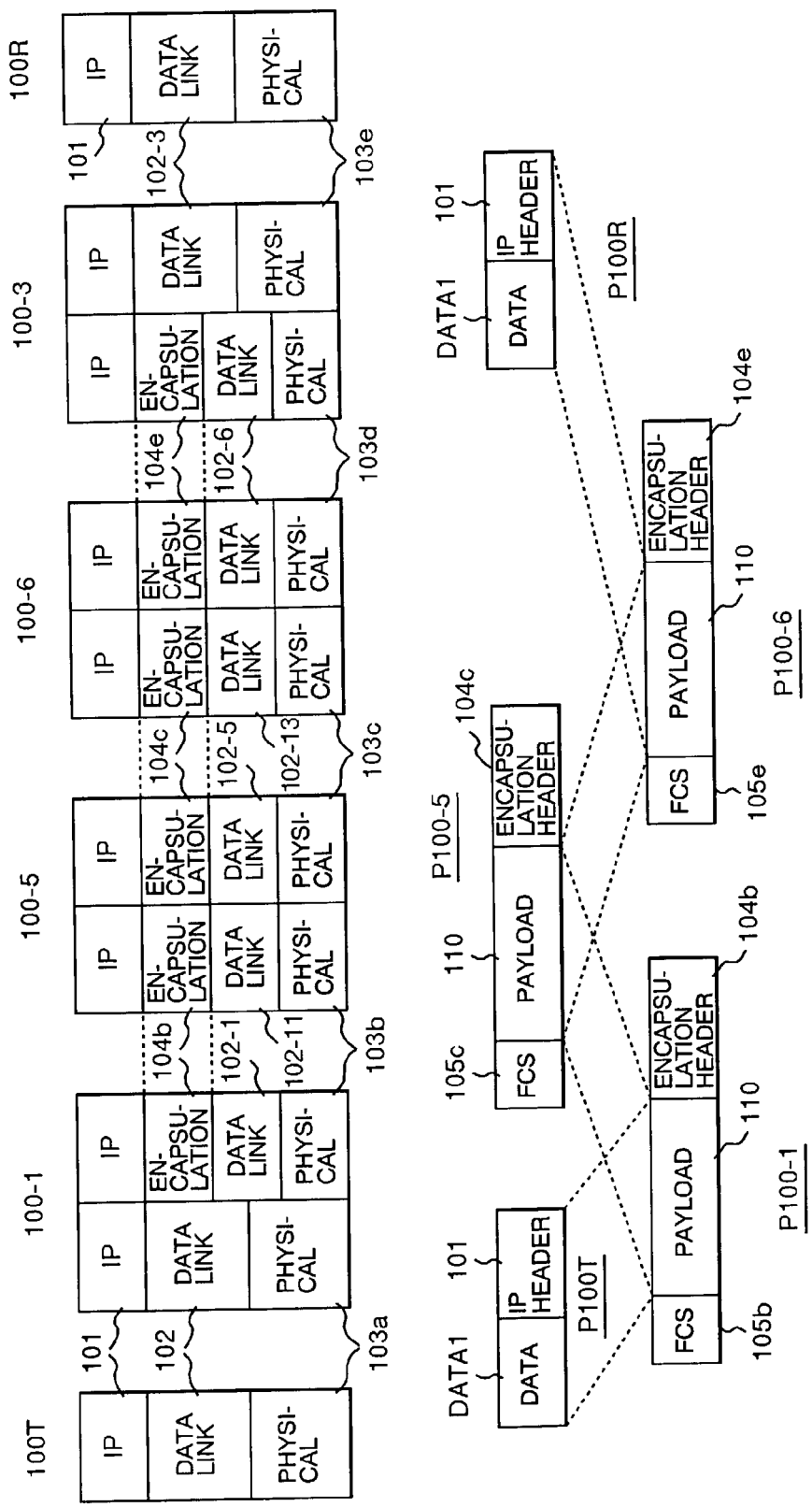
FIG. 3 is a diagram showing the format of each of the transfer packets in the network illustrated in FIG. 2.

FIG. 3 shows the format of each of the packets P100T to P100R.

The IP packet P100T transmitted from the router RT1 and received by the edge node 20-1 is comprised of a data portion DATA1 and the IP header 102. When the IP packet P100T is received, the edge node 20-1 adds an encapsulation header 104b in front of the IP header, adds an FCS (Field Check Sequence) 105b subsequent to the data portion DATA1, adds a header (not shown) of a data link layer to specify neighboring nodes, and transmits the resultant packet as the IP packet P100-1 to the communication network 11.

The original IP packet P100T is located in a payload field 110 in the encapsulated IP packet P100-1. In the core network, packet transfer is carried out in accordance with the destination information indicated by the encapsulation header. The core node 20-5 changes the encapsulation header 104b to the encapsulation header 104c and the core node 20-6 changes the encapsulation header 104c to the encapsulation header 104d in order to transfer the IP packet P100T in the communication networks 12 and 14.

Figure 4:
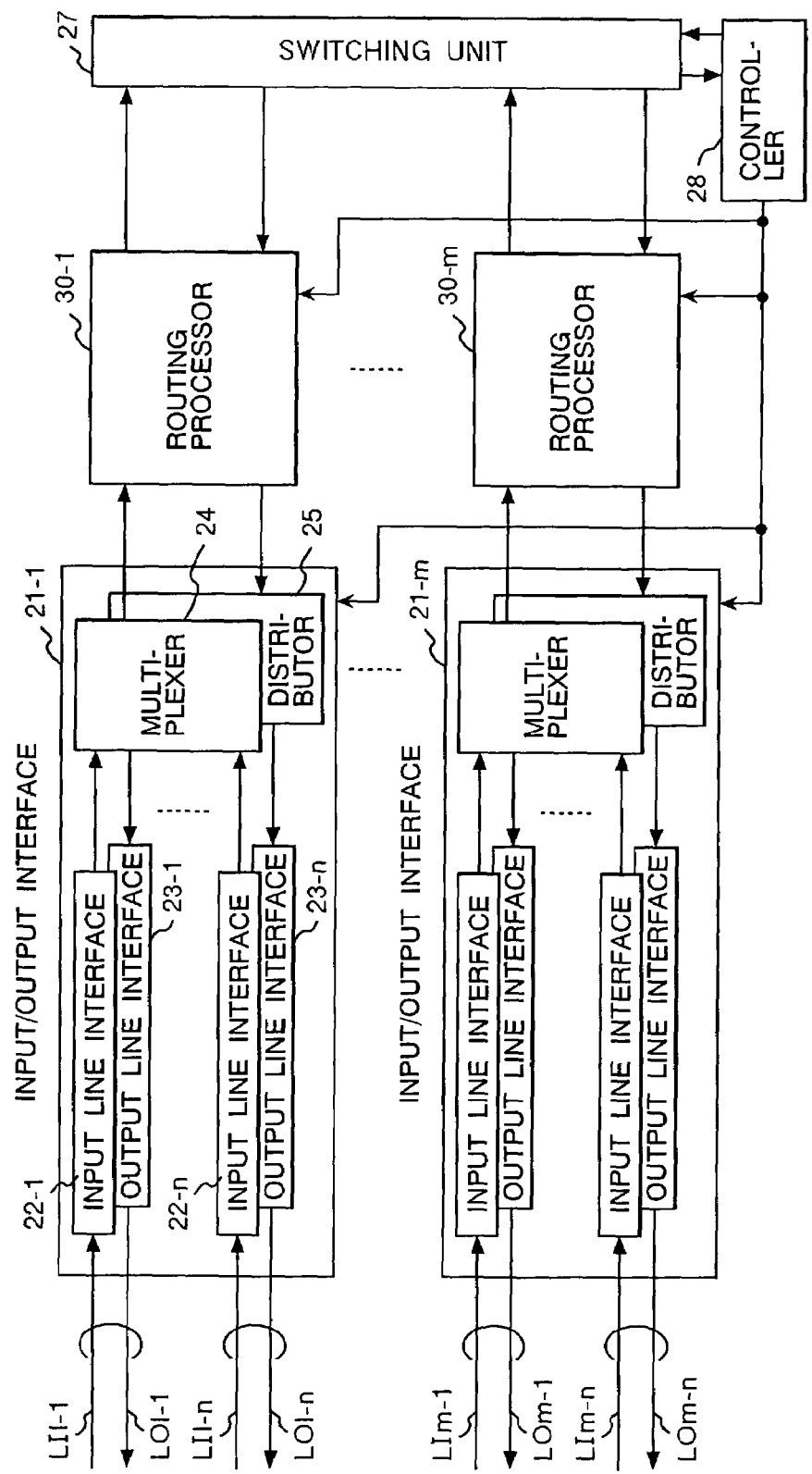
FIG. 4 is a diagram showing the configuration of a node in the embodiment.

FIG. 4 shows the configuration of the node (packet routing apparatus) 20 which can be applied as the edge nodes 20-1 to 20-4 and core nodes 20-5 to 20-14.

The node 20 has a plurality of input/output interface boards 21-i (i=1 to m), routing processors 30-i (i=1 to m), a switching unit 27, and a controller 28. Each of the input/output interface boards 21-i accommodates a plurality of input lines LIi-j and a plurality of output lines LOi-j (i=1 to m, j=1 to n). The routing processors 30-i are provided in correspondence with the input/output interface boards 21-i. The switching unit 27 switches packets among the routing processors 30-i.

Each of the input/output interface boards 21-i has a plurality of input line interfaces (INF) 22-j (j=1 to n), a plurality of output line interfaces 23-j (j=1 to n), a multiplexer 24, and a distributor 25. Each of the input line interfaces (INF) 22-j is connected to each input line. Each of the output line interfaces 23-j is connected to each output line. The multiplexer 24 multiplexes input IP packets output from the input line interfaces 22-1 to 22-n and transmits the resultant to the routing processor 30-i. The distributor 25 distributes output IP packets supplied from the routing processor 30-i to the plurality of output line interfaces 23-1 to 23-n.

Figure 5:
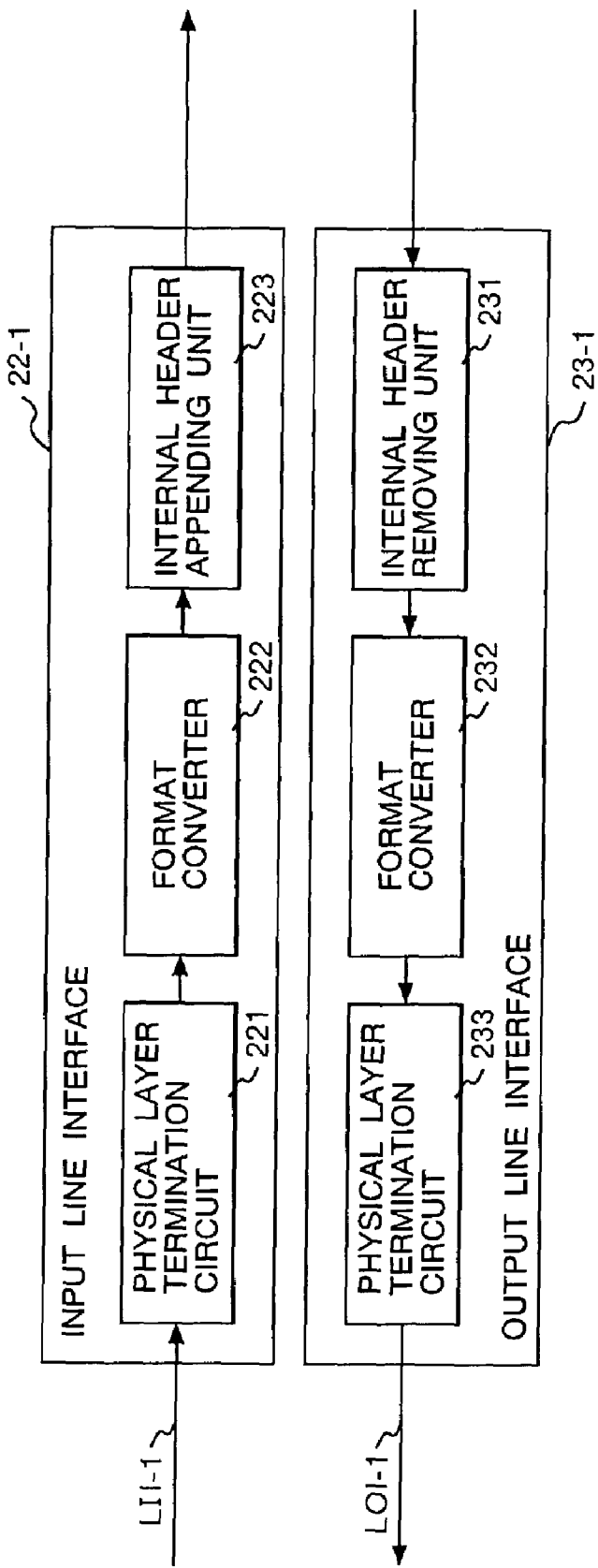
FIG. 5 is a block diagram showing the details of an input/output interface board 21-1 illustrated in FIG. 4.

FIG. 5 shows the details of the input line interface (INF) 22-1 and the output line interface (INF) 23-1.

The input line interface (INF) 22-1 includes an input side physical layer termination circuit 221, a format converter 222, and an internal header appending unit 223. The input side physical layer termination circuit 221 terminates a signal of a physical layer received from the input line LIl-1. The format converter 222 converts a digital signal output from the physical layer termination circuit 221 into an IP packet having header information of the layer 2. The internal header appending unit 223 appends an internal header to the IP packet output from the format converter 222. The internal header includes line information such as a physical port number and a logical port number assigned to the input line LIl-1 and a retrieval table number required by the routing processor 30-1 which will be described hereinlater. The internal header appending unit 223 has a memory for storing various kinds of parameter values as line information. The parameter values are set by the controller 28 shown in FIG. 4.

On the other hand, the output line interface (INF) 23-1 has an internal header removing unit 231, a format converter 232, and an output side physical layer termination circuit 233. The internal header removing unit 231 removes an unnecessary internal header from the output IP packet received from the distributor 25. The format converter 232 converts the IP packet form which the internal header is removed into a digital signal format conformed to the communication protocol of an output line LOl-1. The output side physical layer termination circuit 233 converts an output signal from the format converter 232 into a physical signal and transmits the physical signal to the output line LOl-1.

Figure 1:
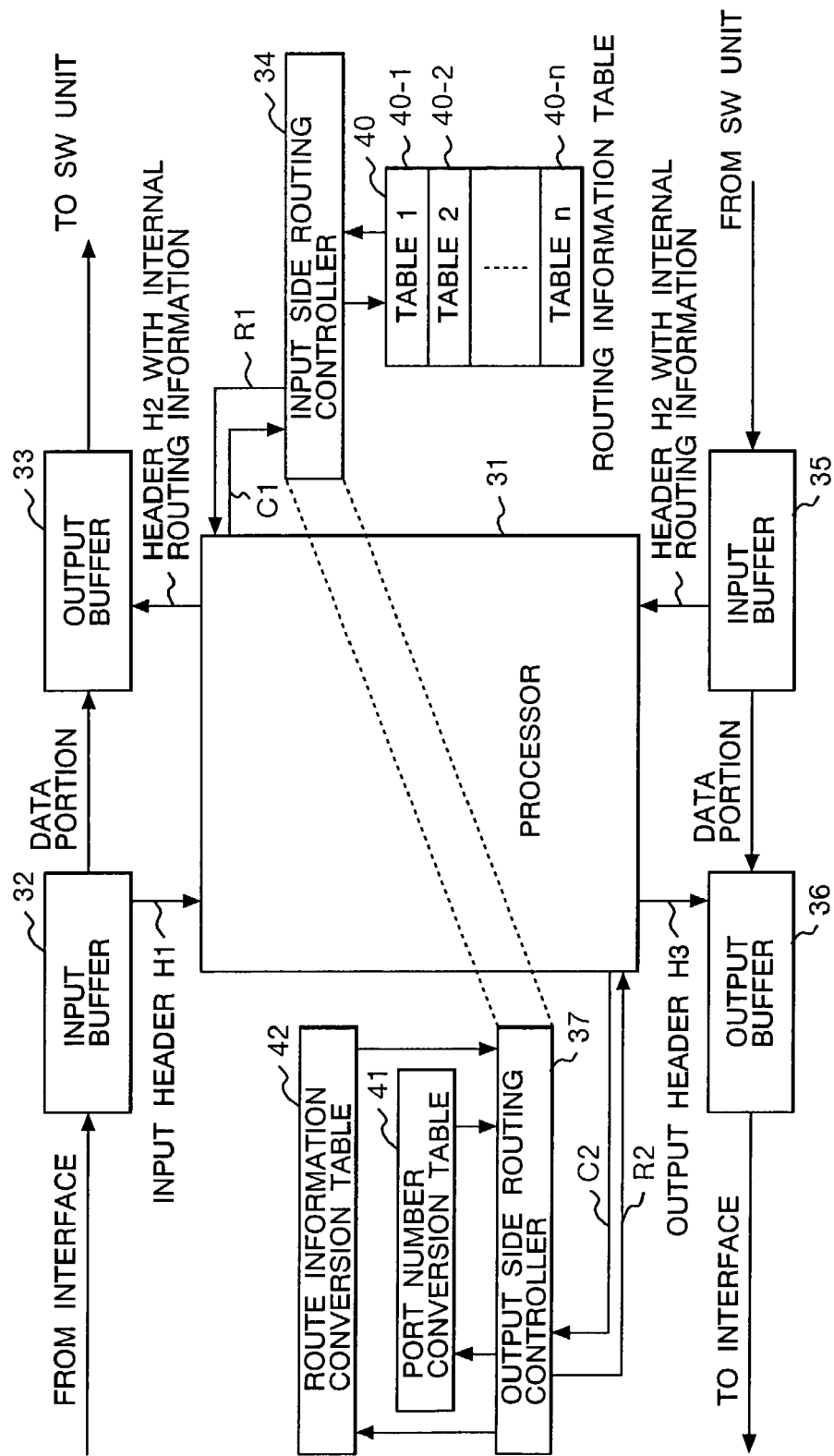
FIG. 1 is a block diagram showing the details of a routing processor 30-1 illustrated in FIG. 4.

FIG. 1 shows the details of the routing processor 30-1 illustrated in FIG. 4.

The routing processor 30-1 includes a processor 31, a first input buffer 32, a first output buffer 33, an input side routing controller 34, a second input buffer 35, a second output buffer 36, and an output side routing controller 37.

The first input buffer 32 temporarily stores an input IP packet supplied from the interface board 21-1 and outputs each IP packet as a header Hi and a data portion DATA1. The first output buffer 33 adds a header H2 with internal routing information supplied from the processor to the data portion DATA1 of the IP packet and transmits the resultant packet to the switching unit 27.

The second input buffer 35 temporarily stores an output IP packet supplied from the switching unit 27 and outputs each IP packet as the header H2 with internal routing information and the data portion DATA1. The second output buffer 36 adds an output header H3 supplied from the processor to the data portion DATA1 in the output IP packet, and transmits the resultant packet to the interface board 21-1.

As will be described later, the input side routing controller 34 refers to a routing information table 40 on the basis of retrieval key information designated by the processor 31, and retrieves information such as encapsulation header information and internal routing information. The routing information table 40 is comprised of a plurality of sub tables 40-1 to 40-n. The number of a sub table to be accessed first by the input side routing controller 34 is designated by the processor 31.

The header H2 given from the processor 31 to the first output buffer 33 is, for example, (a) a header obtained by adding the encapsulation header information and internal routing information retrieved by the input side routing controller 34 to the input header H1, (b) a header obtained by removing the already-included encapsulation header information from the input header H1 and adding the internal routing information to the resultant, or (c) a header obtained by replacing the encapsulation header information included in the input header H1 with the encapsulation header information retrieved by the input side routing controller 34 and adding the internal routing information to the resultant packet.

The output side routing controller 37 retrieves the output physical port number as a part of output header information and the destination address of the second layer with reference to a port number conversion table 41 and a route information conversion table 42 on the basis of retrieval key information designated by the processor 31. The output header H3 supplied from the processor 31 to the second output buffer 36 is obtained by, for example, eliminating the internal routing information from the header H2, replacing the line information added by the input interface unit with the output physical port number, and replacing the destination address of the second layer included in the input header H1 with the second layer destination address retrieved by the output side routing controller 37.

As will be described later, the input side routing controller 34 and the output side routing controller 37 operate alternately. Consequently, in practice, the functions of the two controllers 34 and 37 can be realized by a single routing controller in a time division manner.

Figure 6:
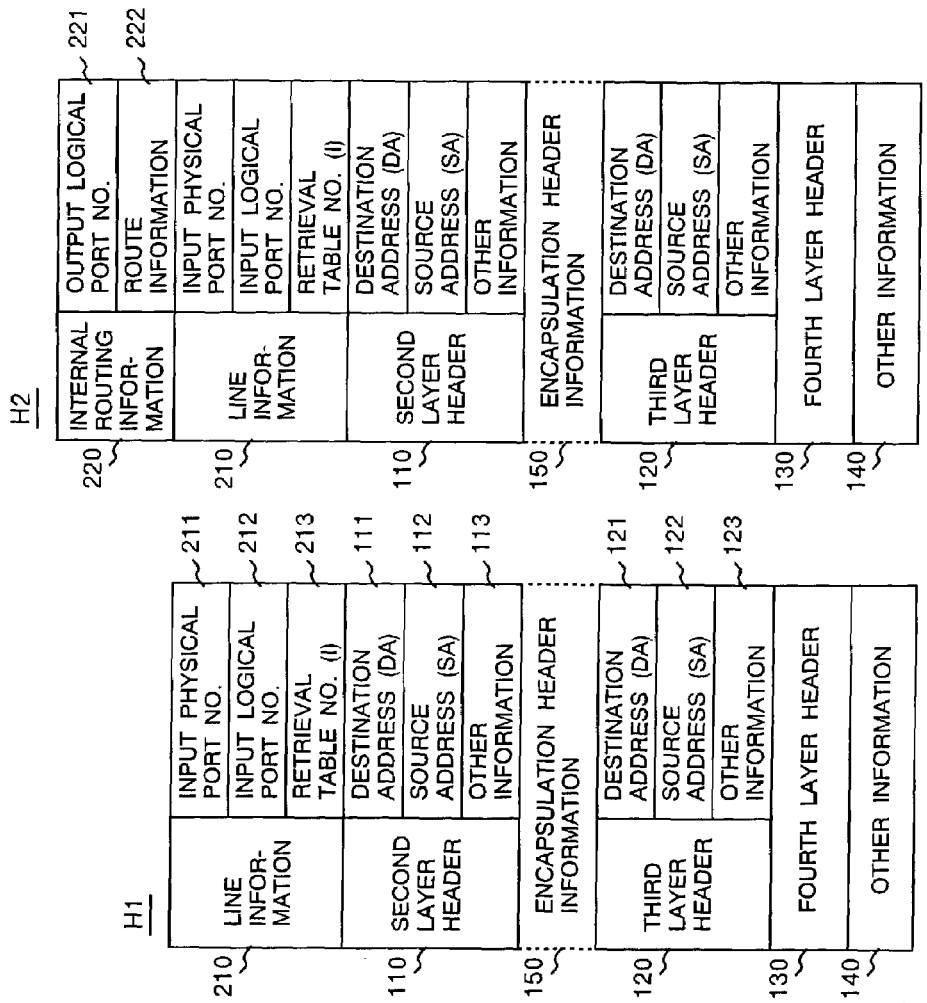
FIGS. 6A, 6B, and 6C are diagrams each showing an example of the structure of a header of an input/output packet in the routing processor 30-1.

Each of FIGS. 6A, 6B, and 6C shows an example of the header structure of an input/output packet in the routing processor 30-1.

A case where the node 20 is used as an edge node, and the input line LIl-1 is connected to an access network will be considered. In this case, the header H1 of a packet which is input from the interface board 21-1 to the routing processor 30-1 includes, as shown in FIG. 6A, a plurality of kinds of header information 110 to 140 corresponding to protocol layers included in the header of an input IP packet from the input line LIl-1 and further includes line information 210 added by the internal header appending unit 223 in the interface board 21-1.

For example, the header information 110 of the second layer (data link layer) includes a destination address (DA) 111, a source address (SA) 112, and other header information 113. The third layer (Internet layer) header information 120 similarly includes a destination address (DA) 121, a source address (SA) 122, and other header information 123. The line information 210 includes a physical port number 211 and a logical port number 212 of the input line LIl-1 and a retrieval table number 213 to be used to retrieve the conversion table 40. For example, when the ATM is employed as the protocol of the second layer, the value of a connection identifier VPI/VCI is set as the destination address 111.

When the input line LIl-1 is connected to the core network, the header H1 of a packet which is input from the interface board 21-1 to the routing processor 30-1 includes, in a position indicated by broken lines, encapsulation header information 150 added by another node in the core network.

When a packet received from the input line LIl-1 is an IP packet to be transferred to the core network, the header H2 of an IP packet output from the routing processor 30-1 to the switching unit includes, as shown in FIG. 6B, the encapsulation header information 150 and the internal routing information 220. The encapsulation header information 150 differs according to a packet transfer method employed by each of the communication networks 11, 12, . . . in the core network 10.

For example, when the MPLS (Multi Protocol Label Switching) protocol for transferring a received packet in accordance with the label attached to an IP packet is employed, the encapsulation header information 150 includes a label, TTL (Time to Live), and other header information. Since the MPLS protocol is positioned between the second and third layers, in the following description, the encapsulation header information 150 of the MPLS will be called header information of the 2.5-th layer.

In the case where the received IP packet is transferred in a form encapsulated with another IP header in the core network, the encapsulation header information 150 includes elements similar to those in the header information 120 of the third layer (Internet layer).

If the input packet at the edge node is a packet to be transferred from an access network to another access network or a packet to be transferred from the core network to the access network, the encapsulation header information 150 shown in the header H2 is unnecessary. Therefore, in the former case, the internal routing information 220 is added to the header H1, thereby generating the header H2. In the latter case, after removing the encapsulation header information 150 from the header H1 of the input packet, the internal routing information 220 is added, thereby generating the header H2.

If a packet output from the routing processor 30-1 to the input/output interface board 21-1 is a packet to be transmitted to the core network, the header H3 has a format as shown in FIG. 6C. Specifically, the header H3 has the contents obtained by removing the internal routing information 220 from the header H2, including the output physical port number 214 as the line information 210, and replacing the destination address 111 included in the second layer header information 110 with the address of the following node. In the case where the output packet is a packet to be transmitted to the access network, the header H3 has the contents obtained by further removing the encapsulation header information 150 from the format shown in FIG. 6C.

Referring to FIGS. 7 to 12, the operation of the routing processor 30-1 will be described hereinbelow.

The processor 31 alternately repeats an input packet processing for processing an input packet received by the first input buffer 32 and an output packet processing for processing an output packet received by the second input buffer 35.

In the input packet processing, the processor 31 reads out the header H1 of the input packet from the first input buffer 32. At this time, the data portion of the input packet subsequent to the header H1 is transferred from the first input buffer 32 to the first output buffer 33.

The processor 31 stores the correspondence relation between the table numbers of sub tables constructing the routing information table 40 and types of retrieval keys of the sub tables. The processor 31 extracts the retrieval table number 213 from the header H1, extracts a retrieval key corresponding to the retrieval table number 213 from the header H1, and supplies a retrieval command C1 in which the retrieval table number 213 and the retrieval key are set to the input side routing controller 34.

Figure 7:
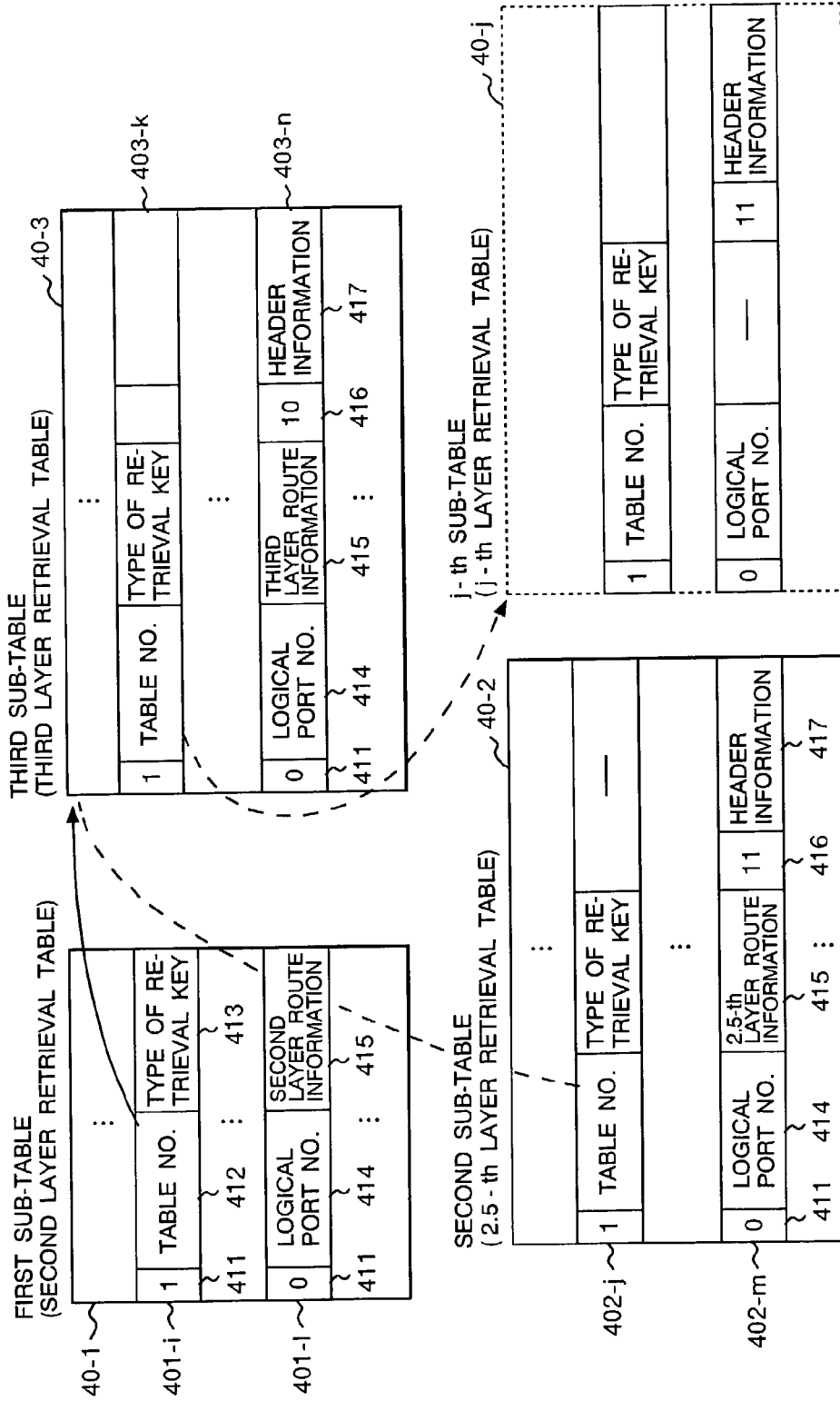
FIG. 7 is a diagram for explaining the configuration of a routing information table 40 illustrated in FIG. 1.

The routing information table 40 is comprised of, for example as shown in FIG. 7, a plurality of sub-tables 40-i (i=1 to m) corresponding to layers of the OSI reference model. The sub-table 40-i includes a sub-table 40-2 for MPLS between the sub-table 40-1 corresponding to the second layer and the sub-table 40-3 corresponding to the third layer. Each sub-table is constructed by a plurality of table entries to be specified by values of retrieval keys.

The first sub-table 40-1 is a routing information retrieval table of the second layer of the OSI reference model, and the destination address 111 included as the second layer header information 110 in the input packet header H1 is used as a retrieval key. The second sub-table 40-2 is a routing information retrieval table for MPLS, and a label included as the encapsulation header information 150 in the input packet header H1 is used as a retrieval key. Similarly, the third sub-table 40-3 is a routing information retrieval table of the third layer of the OSI reference model, and the destination address 121 included as the third layer header information 120 in the input packet header H1 is used as a retrieval key. The processor 31 selects a retrieval key which corresponds to the retrieval table number 213 designated by the input line interface from the retrieval key information included in the input packet header H1, and supplies the selected one as a retrieval command C1 to the input side routing controller 34.

The table entries constructing each sub-table are divided into two types; a next layer retrieval indication entry, and a routing information entry. The type of the table entry is identified by a next layer retrieval indication flag 411 of each entry. A table entry in which "1" is set in the next layer retrieval indication flag 411 is the next layer retrieval indication entry. For example, like the table entries 401-i, 402-j, and 403-k shown in FIG. 7, the next layer retrieval indication entry includes a table number 412 for designating another sub-table to be retrieved next, and a retrieval key (or pointer address) 413 to be used for the sub-table.

A table entry in which "0" is set in the next layer retrieval indication flag 411 is the routing information entry. For example, like the table entries 402-m and 403-n as shown in FIG. 7, the routing information entry includes an output logical port number 414, route information 415, an encapsulation control flag 416, and header information 417 for encapsulation. In the first sub-table 40-1 to be used as the routing information retrieval table of the second layer, as will be described later, since necessary information is obtained by an output packet processing, the routing information entry 401-1 does not include the encapsulation control flag and the header information for encapsulation. Setting of data into the sub-tables is made by the controller 28 shown in FIG. 4.

Figure 8:
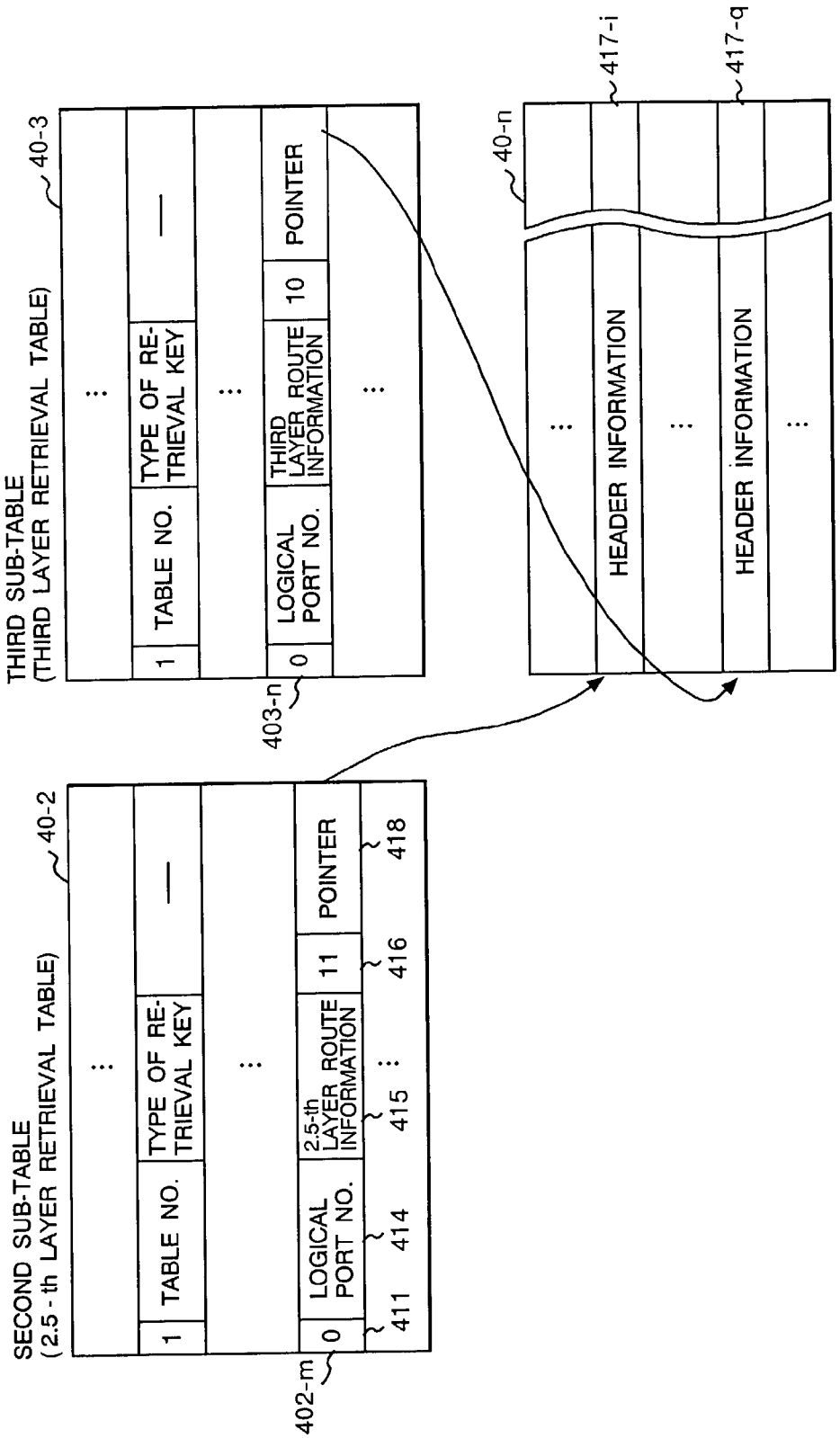
FIG. 8 is a diagram showing another example of the configuration of the routing information table 40.

To effectively use the memory capacity of each sub-table, for example, like entries 417-i and 417-q shown in FIG. 8, header information for encapsulation may be stored in a lump in a single table area 40-n. In this case, the routing information entry in each sub-table has a pointer 418 for reading out the header information, for example, like entries 402-m and 403-n.

Figure 9:
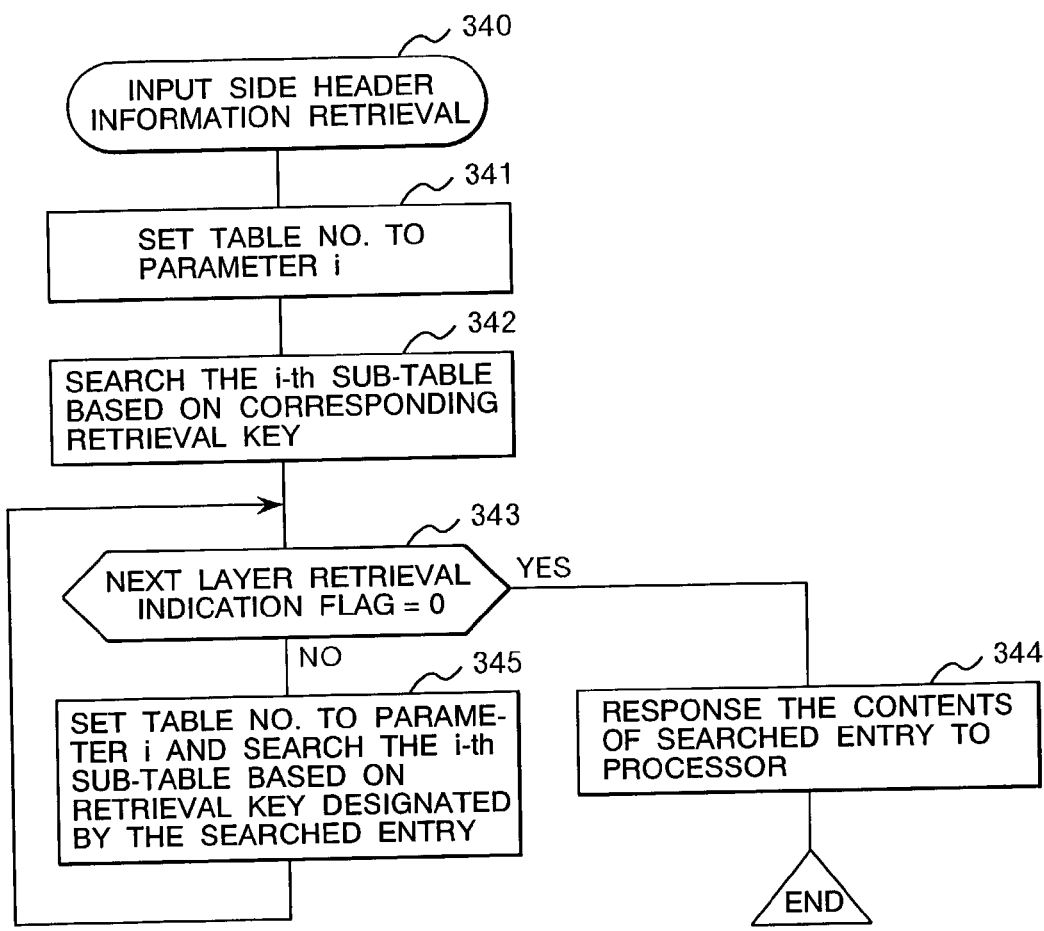
FIG. 9 is a flowchart showing the operations of an input side routing controller 34 illustrated in FIG. 1.

When the retrieval command C1 is received from the processor 31, the input side routing controller 34 executes an input side header information retrieval routine 340 shown in FIG. 9. In the retrieval routine 340, the input side routing controller 34 sets the table number designated by the retrieval command C1 into a parameter "i" (step 341) and searches the i-th sub table based on a retrieval key designated by the retrieval command C1 (step 342). The input side routing controller 34 determines the next layer retrieval indication flag 411 of the retrieved table entry (step 343).

When "0" is set in the flag 411, that is, when the retried entry is a routing information entry, the input side routing controller 34 notifies the processor 31 of the contents of the retrieved routing information entry as a response R1 to the retrieval command C1 (step 344), and finishes the routine.

When "1" is set in the next layer retrieval indication flag 411, that is, when the retrieval entry is the next layer retrieval indication entry, the input side routing controller 34 sets the value of the table number 414 designated by the retrieval entry to the parameter "i", and searches the i-th sub-table on the basis of the retrieval key 415 designated by the retrieval entry (step 345). The input side routing controller 34 determines the next layer retrieval indication flag 411 of the retrieved table entry (step 343).

When the response from the input routing controller 34 is received, the processor 31 generates a header H2 with the internal routing information on the basis of the contents of the input header H1 and the routing information entry and gives it to the first output buffer 33. Specifically, the processor 31 adds the internal routing information 220 including the logical port number 414 and the route information 415 extracted from the routing information entry to the head of the input header H1.

The processor 31 performs an encapsulation processing according to the value of the encapsulation control flag 416 of the routing information entry. For example, when the value of the encapsulation control flag 416 is "10", the processor 31 generates the encapsulation information header 150 on the basis of the header information 417 and inserts the encapsulation information header 150 between the second layer header information 110 and the third layer header information 120. When the value of the encapsulation control flag 416 is "11", the processor 31 replaces the encapsulation header 150 already included in the input header H1 with a newly generated encapsulation header. When the value of the encapsulation control flag 416 is "01", the encapsulation header 150 included in the input header H1 is deleted.

The data portion temporarily stored in the first output buffer 33 is output subsequent to the header H2 with the internal routing information. In such a manner, the header-converted packet is input to the switching unit 27.

In the output packet processing, the processor 31 reads out the header H2 of the input packet from the second input buffer 35. The processor 31 supplies the retrieval command C2 including the output logical port number 221 and the route information 222 extracted from the header H2 to the output side routing controller 37. At this time, the data portion of the input packet subsequent to the header H2 is transferred from the second input buffer 35 to the second output buffer 36.

Figure 10:
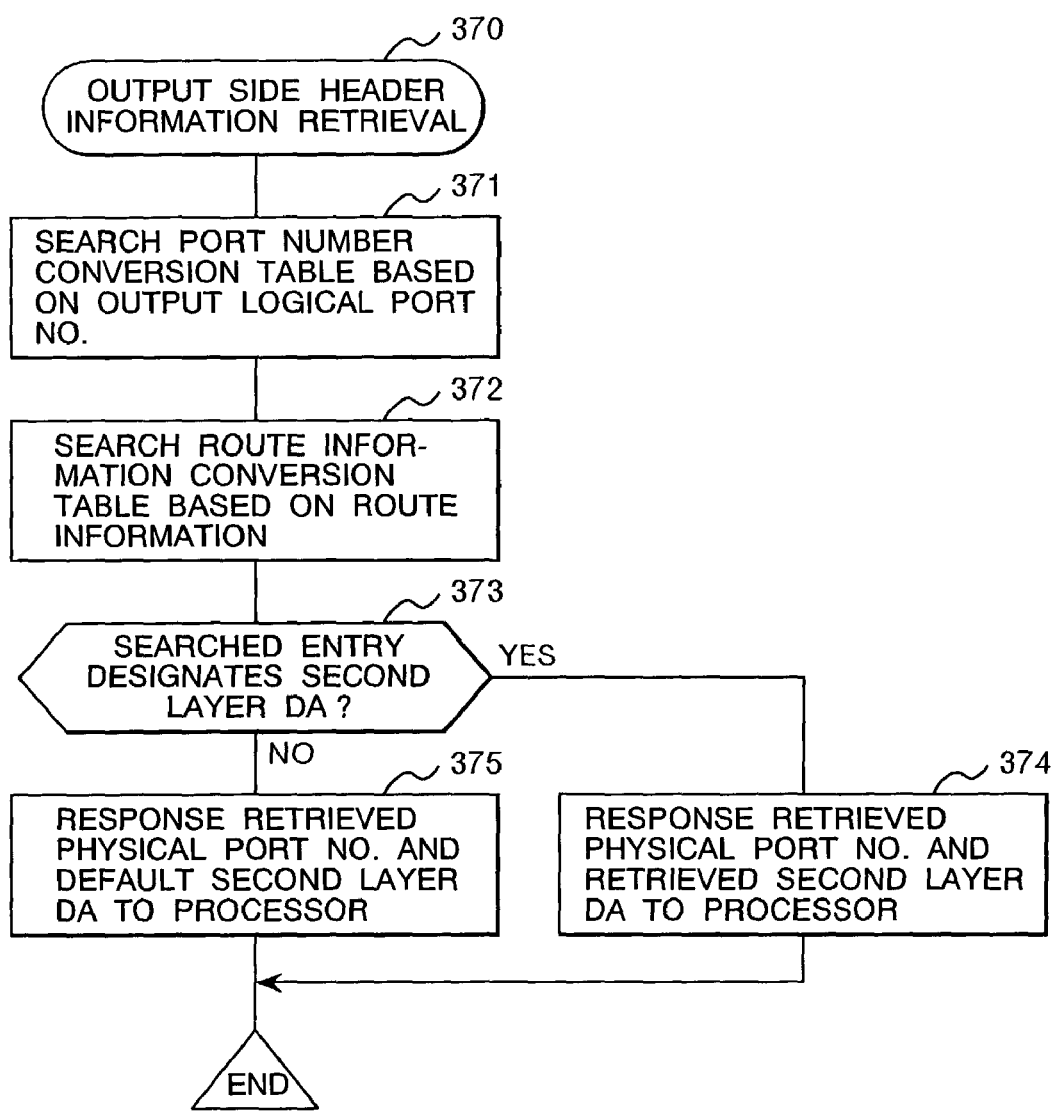
FIG. 10 is a flowchart showing the operations of an output side routing controller 37 illustrated in FIG. 1.

When the retrieval command C2 is received, the output side routing controller 36 executes the output side header information retrieval routine 370 shown in FIG. 10.

In the retrieval routine 370, the output side routing controller 36 searches the port number conversion table 41 on the basis of the output logical port number 221 designated by the retrieval command C2 (step 371), and searches the route information conversion table 42 in accordance with the route information 222 (step 372).

The port number conversion table 41 is comprised of a plurality of table entries 411-i (i=1, 2, . . . ) corresponding to the values of the output logical port numbers as shown in FIG. 11. Each table entry 411-i includes an output physical port number 412 and a default second destination address 413. The route information conversion table 42 is comprised of a plurality of table entries 421-i (i=1, 2, . . . ) corresponding to the values of route information as shown in FIG. 12. Each table entry 421-i includes the destination address of the second layer. All of entries of the route information conversion table 42 do not always include the second layer destination address. Data setting to the port number conversion table 41 and the route information conversion table 42 is carried out by the controller 28 shown in FIG. 4.

The output side routing controller 37 determines the retrieval result of the route information conversion table 42 (step 373). When the second layer destination address is designated by the entry corresponding to the value of the route information 222, the output side routing controller 36 notifies of the processor of, as the response R2 to the retrieval command C2, the output physical port number retrieved from the port number conversion table 41 and the second layer destination address retrieved from the route information conversion table 42 (step 374), and finishes the processing routine. If the second-layer destination address is not designated by an entry corresponding to the value of the route information 222, the output side routing controller 37 notifies the processor of the output physical port number retrieved from the port number conversion table 41 and the default second layer destination address (step 375) and finishes the routine.

The processor 31 generates the output header H3 on the basis of the output physical port number and the second layer destination address received from the output side routing controller 37 and supplies the output header H3 to the second output buffer 36. The output header H3 is generated by removing the internal routing information 220 and the line information 210 which become unnecessary from the header H2, adding new line information 210 including the output physical port number, and replacing the destination address of the second layer header information 110 with the second layer destination address notified from the output side routing controller 37.

Subsequent to the output header H32, the data portion is output from the second output buffer 36. By the operation, a header-converted output packet is supplied to the input/output interface board 21-1. Each of output packets supplied to the input/output interface board 21-1 is distributed to the output line interface 23-j corresponding to the value "j" of the output physical port number 214 by the distributor 25. The line information 210 of an output packet is removed by the internal header removing unit 231 and the resultant packet is input to the format converter 232.

As described above, in the node, the routing information table 40 is comprised of a plurality of sub-tables 40-1 to 40-n corresponding to protocol layers Each of the input line interfaces designates a table number so that the routing processor 30 refers to a sub-table having the designated table number.

Therefore, when the node is used as each of the edge nodes 20-1 to 20-4 shown in FIG. 2, for example, an input line interface connected to the access network designates the retrieval table number 213 indicative of the third layer retrieval table 40-3. Consequently, the routing processor 30 can execute routing information retrieval according to the IP destination address of an input packet. By designating the retrieval table number indicative of the 2.5-th layer retrieval table 40-2 by the input line interface connected to the core network, the routing processor 30 can execute routing information retrieval according to the MPLS input label of the input packet.

In the case where the node is used as the core node 20-5 or 20-6 shown in FIG. 2, each input line interface designates the retrieval table number indicative of the 2.5-th layer retrieval table 40-2, thereby enabling the routing processor 30 to perform the routing information retrieval according to the MPLS input label on each input packet.

In the embodiment, each of the sub-tables constructing the routing information table is provided with the next layer retrieval indication entry indicative of retrieval of another specific sub-table. Consequently, with respect to each of input packets received from the same communication line, routing information can be defined by a sub-table which differs according to the destination address. Therefore, for example, in an edge node, to a packet to be MPLS transferred from a core network to another core network among the packets received from the same communication line, routing information is given from the 2.5-th layer retrieval table 40-2.

On the other hand, to a packet to be relayed from a core network to an access network, the third layer retrieval table 40-3 and the retrieval key are indicated by the next layer retrieval indication entry in the 2.5-th layer retrieval table 40-2. By the entry in the third layer retrieval table 40-3, routing information and control information necessary for the header process are given. It enables the routing processor 30 to execute a header conversion processing different from that performed on the MPLS transfer packet.

To a packet belonging to a VPN, a protocol processing peculiar to the VPN can be designated by using the next layer retrieval indication entry with reference to a sub-table accessed on the basis of destination information of the encapsulation header. Consequently, even when an internal IP address (private IP address) is used, the routing processor 30 can route each of packets accurately.

The next layer retrieval indication entry can be set at multiple stages. For example, for a packet, the second layer sub-table designated by the input line interface can indicate search of the 2.5-th layer sub table, the 2.5-th layer sub-table can indicate search of the third layer sub-table, and the third layer sub-table can give routing information and control information necessary for the header process. In this case, the routing processor 30 determines destination information of the second, 2.5-th, and third layers added to the input packet in a comprehensive manner and executes the routing processing.

By providing a node (packet routing apparatus) with the above-described configuration, the same signal node can easily realize different node functions of the edge node, core node, and edge/core common node in a core network. By replacing the input/output line interface as necessary and changing the entry data of the routing information table, the node (packet routing apparatus) has high general versatility and can be adapted to various communication protocols and packet transfer modes.

What is claimed is:

1. A packet routing apparatus comprising:
   a plurality of input line interfaces connected to input lines, respectively;
   a plurality of output line interfaces connected to output lines, respectively; and
   at least one routing processor for specifying a transfer destination of an input variable length packet by referring to a routing information table based on header information of the input packet,
   wherein said routing information table is comprised of a plurality of sub-tables, each of the sub-tables including at least one first type entry indicative of routing information and at least one second type entry for designating another said sub-table to be referred to,
   said routing processor refers to one said sub-table determined according to the input line interface and, when the second type entry is retrieved as a table entry having a relation corresponding to the input packet, refers to the another sub-table designated by the second type entry to thereby specify the transfer destination of said input packet,
   said packet routing apparatus routes the input packet received by any of said input line interfaces to an output line interface specified by said routing processor,
   each of said input line interfaces has an adding unit for adding sub-table designation information to the packet received from the input line, and
   said routing processor specifies a sub-table to be referred to on the basis of sub-table designation information extracted from each input packet.

2. The packet routing apparatus comprising:
   a plurality of input line interfaces connected to input lines, respectively;
   a plurality of output line interfaces connected to output lines, respectively; and
   at least one routing processor for specifying a transfer destination of an input variable length packet by referring to a routing information table based on header information of the input packet,
   wherein said routing information table is comprised of a plurality of sub-tables, each of the sub-tables including at least one first type entry indicative of routing information and at least one of the sub-tables includes, in addition to said first type entry, at least one second type entry for designating another said sub-table to be referred to,
   said touting processor refers to one said sub-table determined according to the input line interface and, when the second type entry is retrieved as a table entry having a relation corresponding to the input packet, refers to the another sub-table designated by the second type entry to thereby specify the transfer destination of said input packet, and
   said packet routing apparatus routes the input packet received by any of said input line interfaces to an output line interface specified by said routing processor,
   said routing information table is comprised of the plurality of sub-tables corresponding to protocol layers.

3. The packet routing apparatus according to claim 1, wherein at least one of said sub-tables includes, as said first type entry, a table entry indicative of routing information and encapsulation header information, and
   said routing processor encapsulates the input packet or rewrites an encapsulation header in accordance with encapsulation header information retrieved from said sub-table.

4. A packet routing apparatus comprising:
   a plurality of input line interfaces connected to input lines, respectively;
   a plurality of output line interfaces connected to output lines, respectively; and
   at least one routing processor for specifying a transfer destination of an input variable length packet by referring to a routing information table based on header information of the input packet,
   wherein said routing information table is comprised of a plurality of sub-tables, each of the sub-tables including at least one first type entry indicative of routing information and at least one of the sub-tables includes, in addition to said first type entry, at least one second type entry for designating another said sub-table to be referred to,
   said routing processor refers to one said sub-table determined according to the input line interface and, when the second type entry is retrieved as a table entry having a relation corresponding to the input packet, refers to the another sub-table designated by the second type entry to thereby specify the transfer destination of said input packet, and said packet routing apparatus routes the input packet received by any of said input line interfaces to an output line interface specified by said routing processor, at least one of said sub-tables includes, as said first type entry, a table entry indicative of routing information, encapsulation header information, and a control code, and said routing processor adds, removes, or rewrites an encapsulation header of the input packet in accordance with encapsulation header information and a control code retrieved from said sub-table.

5. A packet routing apparatus comprising:

a plurality of input line interfaces connected to input lines, respectively;

a plurality of output line interfaces connected to output lines, respectively; and at least one routing processor for specifying a transfer destination of an input variable length packet by referring to a routing information table based on header information of the input packet, wherein said routing information table is comprised of a plurality of sub-tables, each of the sub-tables including at least one first type entry indicative of routing information and at least one of the sub-tables includes, in addition to said first type entry, at least one second type entry for designating another said sub-table to be referred to, said routing processor refers to one said sub-table determined according to the input line interface and, when the second type entry is retrieved as a table entry having a relation corresponding to the input packet, refers to the another sub-table designated by the second type entry to thereby specify the transfer destination of said input packet, and said packet routing apparatus routes the input packet received by any of said input line interfaces to an output line interface specified by said routing processor, each of said input line interfaces outputs an IP packet including header information of a second layer of an OSI reference model in a packet header, and said routing processor searches said routing information table for routing information corresponding to header information of each input packet, thereby specifying the transfer destination of the input packet.

6. The packet routing apparatus according to claim 5, wherein said routing processor rewrites the second layer header information of each output packet to be supplied to an output line interface.

7. A packet routing apparatus comprising:

a plurality of input/output interface units each having a plurality of input line interfaces and a plurality of output line interfaces;

a plurality of routing processors having a packet header converting function, each provided for each of said input/output interface units; and a switching unit for switching packets among said plurality of routing processors, wherein each of said routing processors has a routing information table divided into a plurality of sub-tables, each of the sub-tables includes a first type entry indicative of routing control information, at least one of the sub-tables includes, in addition to said first type entry a second type entry for designating another sub-table to be referred to, each of said input line interfaces has an adding unit for adding sub-table designation information to a header portion of an input packet received from the input line, and each of said routing processors retrieves a table entry corresponding to header information of an input packet from a sub-table specified by sub-table designation information added to the input packet, when the second type entry is retrieved, retrieves the first type entry by referring to another sub-table designated by the second type entry, and converts the header of each input packet in accordance with routing control information indicated by the retrieved first type entry.

8. The packet routing apparatus according to claim 7, wherein said routing processor has a first processing unit for generating an internal header in accordance with routing control information retrieved from said routing information table, adding the internal header to each input packet, and outputting the packet having the internal header to said switching unit, and a second processing unit for removing header information which becomes unnecessary from an output packet received from said switching unit and supplying the packet from which the unnecessary header information was removed to said input/output interface unit, and said switching unit switches packets in accordance with the routing information included in said internal header.

9. The packet routing apparatus according to claim 7, wherein said first type entry includes, as said routing control information, internal routing information and encapsulation header information, each of said routing processors has a first processing unit for encapsulating an input packet in accordance with the encapsulation header information retrieved from said routing information table, adding the internal routing information retrieved from said routing information table to each input packet, and outputting the packet having the internal routing information to said switching unit, and a second processing unit for removing header information which becomes unnecessary from an output packet received from said switching unit and supplying the packet from which the unnecessary header information was removed to said input/output interface unit, and said switching unit switches packets in accordance with the routing information included in said internal header.

10. The packet routing apparatus according to claim 7, wherein each of said input/output interface units comprises:

a packet multiplexer for sequentially supplying input packets output from said plurality of input line interfaces to said routing processor, and a packet distributor for distributing output packets received from said routing processor to said plurality of output line interfaces.

11. The packet routing apparatus according to claim 7, wherein said routing information table is comprised of the plurality of sub-tables corresponding to protocol layers.

12. A routing controller disposed between a packet switch and an input/output line interface, comprising:

a routing information table;

an input side routing processor for performing header conversion on an input packet received from the input line interface and outputting the packet having been received header conversion to the packet switch; and an output side routing processor for removing header information which becomes unnecessary from an output packet received from the packet switch and outputting the packet from which the unnecessary header information was removed to the output line interface, wherein said routing information table is comprised of a plurality of sub-tables, each of the sub tables includes at least one first type entry indicative of routing information, and at least one of the sub-tables includes, in addition to said first type entry, at least one second type entry for designating another sub-table to be referred to, and said input side routing processor refers to a sub-table indicated by a table number added to the header of the input packet by the input line interface, when the second type entry is retrieved as a table entry having a relation corresponding to header information of the input packet, retrieves the first type entry by referring to another sub-table designated by the second type entry to obtain routing information, and adds the routing information to the header of the input packet.

13. The routing controller according to claim 12, wherein said output side routing processor has a table in which address information of a second layer of an OSI reference model is stored in correspondence with routing information, retrieves second layer address information corresponding to routing information of an output packet from said table, and adds the retrieved second layer address information to the output packet.

* * * * *